United States Patent [19] [11] 4,160,471
Lapointe [45] Jul. 10, 1979

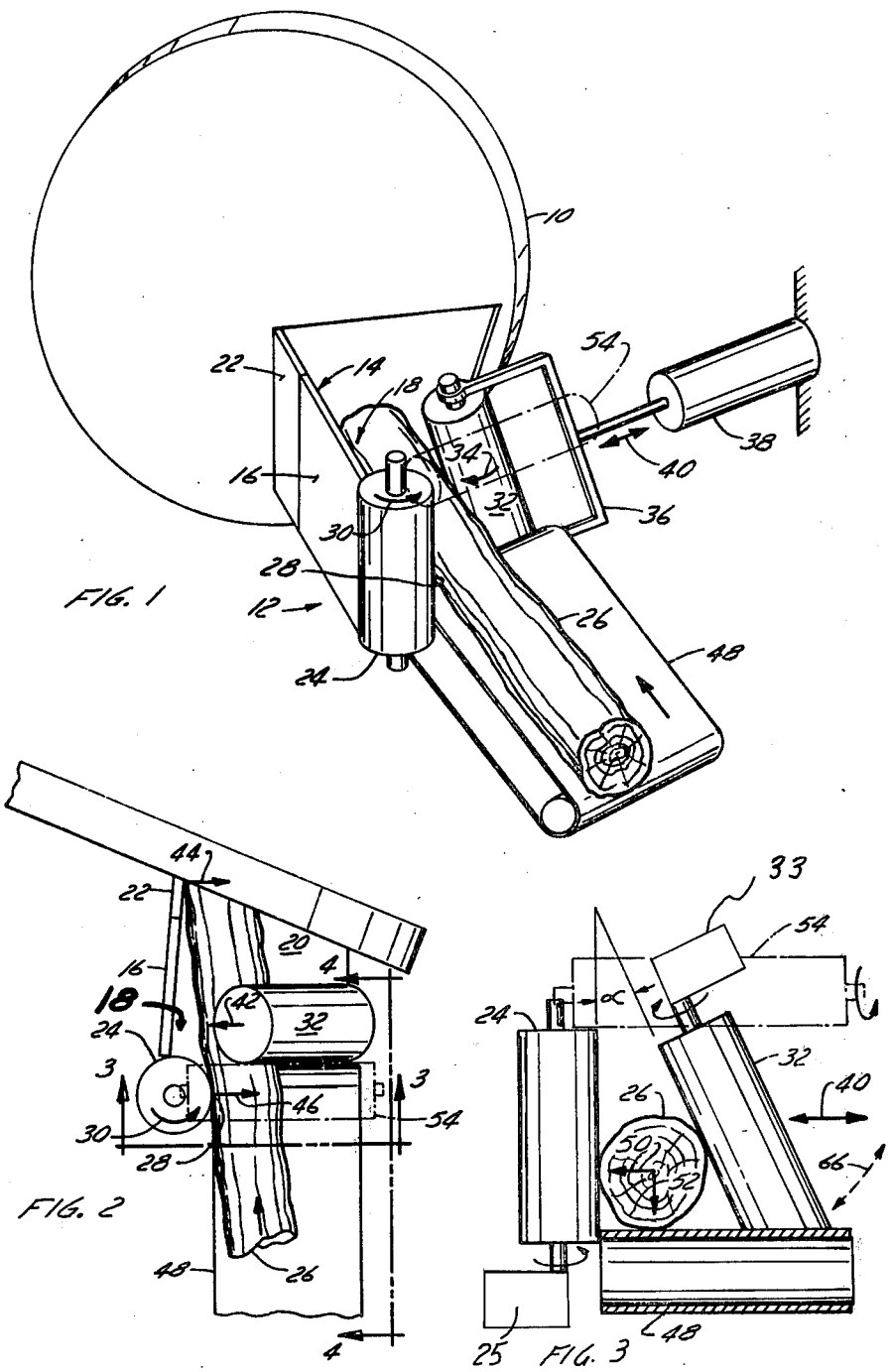

[54] POWER INFEED FOR CHIPPER

[75] Inventor: Joseph A. Lapointe, Montreal, Canada

[73] Assignee: Domtar Inc., Montreal, Canada

[21] Appl. No.: 826,411

[22] Filed: Aug. 22, 1977

[51] Int. Cl.² .............................................. B27C 1/12
[52] U.S. Cl. .................................. 144/176; 198/782; 414/432; 144/162 R; 144/242 C; 144/246 B; 144/249 B
[58] Field of Search ................ 214/338, 339; 198/780, 198/782; 144/162 R, 176, 181, 246 R, 246 A, 246 B, 246 E, 246 F, 249 R, 249 B, 242 C

[56] References Cited
U.S. PATENT DOCUMENTS

| 1,947,728 | 2/1934 | Mitchell | 144/181 X |
| 3,263,719 | 8/1966 | Alexander | 144/176 |
| 3,854,614 | 12/1974 | Albrecht | 214/339 |
| 4,027,769 | 6/1977 | Hasenwinkle | 144/246 R |

Primary Examiner—Donald R. Schran
Assistant Examiner—W. D. Bray
Attorney, Agent, or Firm—C. A. Rowley

[57] ABSTRACT

A chipper infeed spout incorporating two surfaces disposed to form a V-shape having one side formed by a pair of support means (an anvil member and preferably a roll). A driven power roll is moveable across the direction of travel of the log along said spout and tends to align the log and force it against the pair of support means whereby the log forms a beam freely supported (by the support means) and having a concentrated load (power roll) interposed between the supports. Preferably the power roll is oriented to apply forces to a log not only to tend force it against the two spaced supporting means but also to force it toward the apex of the V of the V-shaped supporting surfaces. When the chipper is used as a slab chipper it is preferable to form one of the support means by a driven roll that is arranged at an angle and driven in a direction to tend to lift the side of the slab that contacts the roll whereby the movement of the power roll tends to align the major dimension of the slab flat against roll and thus the anvil number.

8 Claims, 7 Drawing Figures

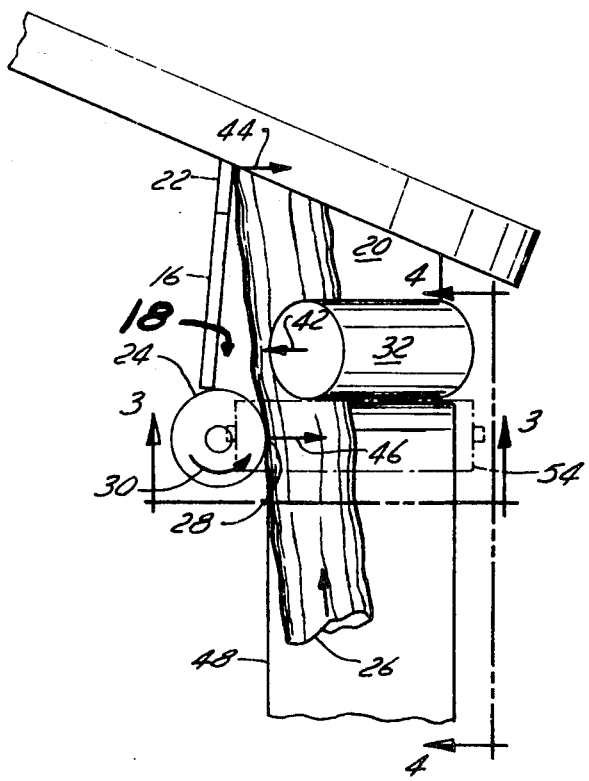

POWER INFEED FOR CHIPPER

The present invention relates to a chipper infeed mechanism, more specially to an infeed mechanism that positions and maintains a log in position as it is advanced into a chipper.

One of the criterion determining the quality of the chips produced by a given chipper, for example, a disc-type chipper, is the steadiness with which the log being chipped is held against the anvil and in position thereby to maintain the feed angle of the log to the chipping head substantially constant. Conventionally rolls are used to grip logs and feed them into a chipper, for example, the feeding device shown in Canadian Pat. No. 592,795 issued Feb. 16, 1960 to Nyholm provides a driven pressure roll pressing the logs or slabs to be chipped against a conveyor and feeding the logs or slabs into the chipper.

Canadian Pat. No. 655,581 issued Jan. 8, 1963 to Ealet mounts one of a pair of horizontal rolls on a universal joint so that the periphery of the roll aligns with the apparent slope of the slab to provide a more positive grip forcing the slab or log into the chipper.

Canadian Pat. No. 532,066 issued Oct. 23, 1966 to Clark discloses a chipper having a V-shaped infeed spout and a hold down roll for pressing the logs or slabs against the substantially horizontal portion of the V-shaped spout. The horizontal portion of the spout is formed by a plurality of live rollers which tend to move the log or slab laterally towards the apex of the V-shaped part of the spout i.e. into contact with the substantially vertical wall of the spout. Thus the hold down roller presses the log down onto the live rollers and these live rollers tend to move the log towards the apex of the spout. Obviously the mechanism comprising the hold down and live rollers together with their drives are quite complicated and therefore expensive. Furthermore the force applied by the hold down roll tends to resist the forces applied by the live rollers so that one drive is to an extent working against the other.

Applicants prior Canadian Pat. No. 781,759 issued Apr. 2, 1968 teaches another way of positioning and aligning a log being fed to a wafer type chipper. The device of this patent comprises a conveyor mechanism moving in a direction across the feed direction to force the logs into alignment against a guide means and along the guide into the chipper.

In whole tree chippers it is important that the infeed mechanism bends the branches into a position adjacent the trunk of the tree to form a bundle that can enter the chipper through the feed spout. An example of such an infeed mechanism is shown in Canadian Pat. No. 943,045 issued Mar. 5, 1974 to Smith. This infeed mechanism uses a pair of cooperating substantially vertically extending horizontally opposed feed rolls to define the width of the bundle in cooperation with a hydraulically operated essentially horizontal hold down roll that presses the trees toward the essentially horizontal infeed conveyor to define the height of the bundle. This device does not force the logs into proper alignment relative to the chipper disc nor does it maintain the proper alignment during the chipping operation.

The present invention provides an infeed for a chipper which positions and securely holds a log against an anvil member of the chipper. The invention may be incorporated in a variety of different types of chippers, for example in whole tree chippers or conventional chippers or waferizers and with a simple modification provides a further improved slab chipper wherein orientation of the slab relative to the anvil is aided.

Broadly the present invention relates to an infeed for a chipper comprising, an anvil member, a backing member spaced upstream along a feed path of a log to said chipper from the anvil member, a power roll mounted for movement on a path traversing said feed path between the backing member and said anvil member, means for moving said powered roll in said path traversing said feed path, thereby to force said log against the anvil member and said backing member whereby said anvil member and said backing member provide a pair of spaced support means and said powered roll tends to force said log being fed against said pair of support means and means to rotate said power roll to feed said log into said chipper. Preferably the infeed spout is partly V-shaped in cross section with the anvil forming one leg of the V-shape and said power roll tends to force a log into the apex of the V-shape as the log is fed to the chipper.

Further features, objects and advantages will be evident from a following detailed description of a preferred embodiment of the present invention, taken in conjunction with the accompanying drawings in which:

FIG. 1 is an isometric schematic representation of the infeed mechanism of the present invention.

FIG. 2 is a schematic plan of the infeed mechanism of FIG. 1.

FIG. 3 is a section along the lines 3—3 of FIG. 2.

Figure 4:
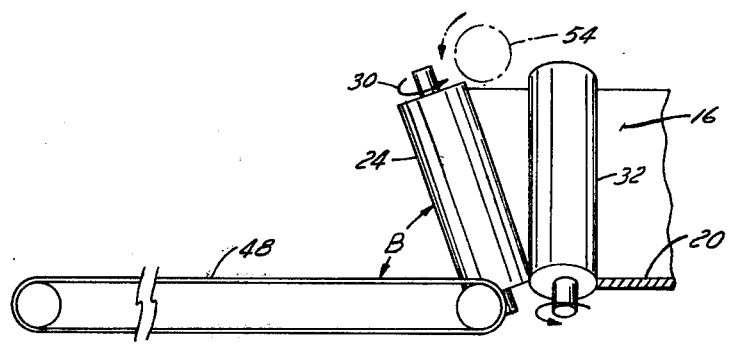
FIG. 4 is a side elevation along the lines 4—4 of FIG. 2 showing a modification of the present invention.
Figure 5:
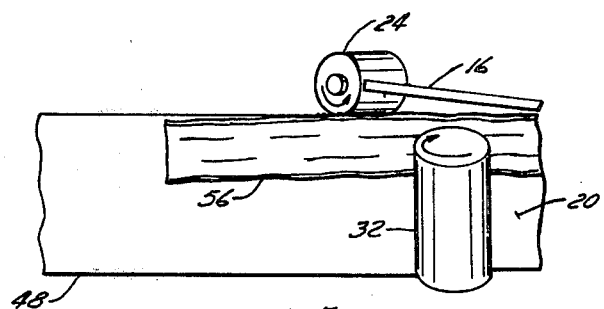
FIG. 5 is a plan view of the modification of FIG. 4.

FIG. 1 schematically illustrates a chipper having an infeed mechanism generally indicated at 12. Infeed mechanism 12 comprises a partially V-shaped cross section infeed spout 14 having a substantially vertical side section 16, at an angle to the feed path of a log to provide an open free space 18 to accommodate the power roll as will be described in more detail hereinbelow, and a substantially horizontal section formed by support plate 20 (see FIG. 2).

The side section 16 extends between an anvil number 22 and a support member 24 i.e. the member 24 is spaced upstream of the anvil member 22 along the feed path of a log 26. The support member 24 has one edge 28 thereof that contacts and supports the log 26 and this edge 28 and the anvil member 22 provides a pair of spaced support means that form a guide against which a log is forced thereby to align the log for feeding into the chipper. Support member 24 preferably is formed by a roll which preferably in drive by motor means 25 (FIG. 3) in the direction of the arrow 30 to advance a log 26 into the chipper. It is also preferred that the support means 28 be substantially parallel to the anvil member or support means 22. The side section 16 guides the log to the anvil 22 and into the chipper.

A power roll 32 driven by motor means 33 in the direction of the arrow 34, feeds a log 26 into the chipper and is mounted for movement along a path traversing the feed path of log 26 into the chipper between the anvil 22 and the support edge 28. The power roll 32 is on the side of the feed path of the log opposite the vertical section 16 of the spout 14. In the illustrated arrangement power roll 32 is mounted on a yoke 36 which is moved by means of a hydraulic piston and cylinder mechanism 38 in the direction of the arrow 40 back and forth across the feed path for the log. By positioning the roll 32 between the support means 28 and (anvil) 22, forces applied to the log by the power roll 32 across the feed path of the log simulate beam loading on a simple beam freely supported (22 and 28) with a concentrated load (power roll 32) between the two support points 22 and 28, i.e. the force indicated by the arrow 42 is interposed between the two reacting forces 44 and 46 generated at the anvil 22 and the contact line 28 on the roll 24 and the log is substantially unsupported therebetween. This bending action and concentration of forces 42, 44 and 46 insures that the end of the log entering the chipper (adjacent to anvil 22) is firmly held against the anvil 22.

It will be noted that the power roll 32 has its rotational axis arranged at an angle $\alpha$ to the rotational axis of the roll 24 i.e. to the line of contact or support means 28 and anvil 22. This angle $\alpha$ preferably will be greater than about 0° and normally would not exceed about 75° and preferably will be between about 5° and 50° and most preferably between 15° and 35°. It will also be noted that the horizontal support plate 20 is substantially perpendicular (generally in the range of 70° to 90°) to the rotational axis of the roll 24 and thus to the support means or contact line 28 and to the anvil 22. The force of the roll 32 against the log 26 holding the log in a position against the roll 24 and anvil number 22 has a vertical component (proportional to the angle $\alpha$) forcing the log against the horizontal support plate 20 i.e. log 26 is wedged into the apex formed between the vertical section 16 (anvil 22 and roll 24) and the horizontal section 20. The major component of the force applied to the log 26 by roll 32 is in a direction to force the log against the anvil 22 and roll 24 and a minor component forces the log against the plate 20, as indicated by the arrows 50 and 52 respectively.

A roll 54 rotating on an axis substantially parallel to the horizontal conveyor 48 and positioned spaced thereabove is normally provided if the invention is to be applied to a whole tree chipper. The roll 54 functions to define the maximum vertical dimension of the bundle formed by the branches as the whole tree is fed into the chipper (see FIGS. 1, 2, and 3). The width of such a bundle is determined by power roll 32 and the section 16 particularly roll 24 which will normally be driven. The power roll 32 squeezes the branches toward the bole (and the anvil) so the tree may enter the chipper at the desired angle relative to the chipping head.

Figures 6, 7:
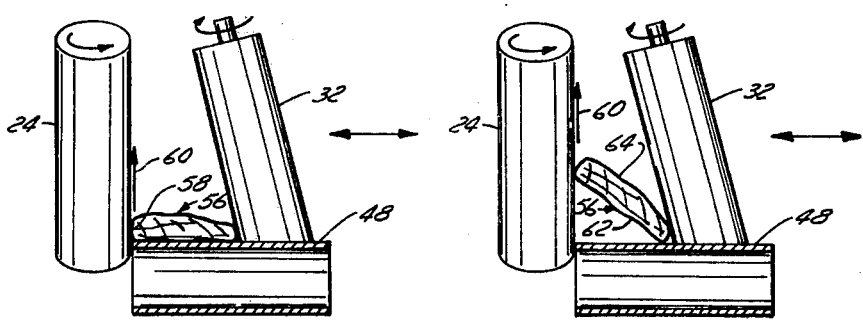
FIGS. 6 and 7 illustrate the operation of the FIGS. 4 and 5 embodiment, tipping a slab into the operative position.

FIGS. 4, 5, 6 and 7 show a modification of the present invention particularly suited for a slab chipper. In this arrangement the roll 24 has its rotational axis in a plane substantially perpendicular to the horizontal infeed conveyor 48 or plate 20 and parallel with anvil 22, but it is inclined at less than 90° to the incoming slabs upstream in the direction of log feed, preferably at an angle in the range of about 85° to 60° as indicated by angle B in FIG. 4. The reminder of the infeed mechanism of this embodiment may be essentially the same as described hereinabove except that it is essential that the contact point or support means 28 be on the periphery of a roll 24 and the roll be driven as indicated by the arrow 30. In operation a slab such as a slab 56 shown in FIGS. 5, 6 and 7 engages the roll 24 adjacent to conveyor 48 at one edge of the slab as indicated at 58. The surface of the roll 24 contacting the edge 58 is moving in the direction to apply forces having a feed direction component and with a vertical component due to the angle B, to the edge 58 of the slab 56. This vertical component 60 tends to tilt the slab 56 as indicated in FIG. 7 and as tilting occurs, the roll 32 forces the slab into a position with one of its major surfaces into face to face relationship with the surface of the roll 24 and thereafter with the anvil number 22. This tilting of the slab tends to insure that the slabs entering the chipper are oriented with one of their main or flat faces as indicated at 62 and 64 resting against the anvil number 22. When the infeed is used for slabs the forces applied by roll 32 are significantly less than those applied when the chipper is used as a whole tree chipper.

In the arrangements illustrated, the roll 32 has been shown as mounted with a reciprocal movement in the direction of the arrow 40 via a hydraulic cylinder or the like 38. It is also quite conceivable to mount the roll 32 via a pivoted arm and to pivot the arm to move the roll 32 on an arc. Such an arrangement is schematically represented by the arrow 66 in FIG. 3. It is also preferred when using this arrangement to insure that when the roll 32, mounted on the pivoted arm, is moved toward the roll 24 the component forces applied to the log 26 as indicated 50 and 52 in FIG. 3 be maintained i.e. the log 22 preferably will be forced into the apex formed between the section 16 and the plate 22 or horizontal conveyor 48 obviously the relative strength of these component forces will be dependant on the size (diameter) of the log being fed, and position of the axis on which the arm is pivoted due to the pivoting movement of the roll. With this pivoted arm arrangement and a large diameter log the angle $\alpha$ may exceed 45° and could be as high as about 75° which will make the component forcing the log toward the side 20 higher than the component forcing the log toward the anvil 22 and support 24, but the log will still be urged toward the apex of the V-shaped spout.

The path of travel of the roll 32 will normally be substantially perpendicular to the feed path of the log. When the chipper is used as a slab chipper further hold down elements or rolls may be provided between the roll 32 and the chipping head to ensure better chipping of the slab.

Modifications may be made without departing from the spirit of the invention as defined in the appended claims.

I claim:

1. An infeed for a chipper comprising an anvil member forming a support having limited surface contact with a log to be chipped, a chipping head cooperating with said anvil a backing member spaced from said anvil member along a feed path of a log to said chipper, a power roll, means to rotate said power roll to advance a log towards said chipper, means mounting said power roll for movement in a path traversing said feed path between said anvil and said backing member, said anvil and said backing member forming a pair of support means spaced along said feed path, said pair of support means providing a pair of adjacently spaced contact points for said log as it is fed to said chipper, means for moving said power roll in said path traversing said feed path, said contact points and said power roll defining means whereby said logs simulates a beam supported by said adjacently spaced contact points against a concentrated load applied therebetween by said power roll as said log is fed to said chipper.

2. An infeed for a chipper as defined in claim 1 wherein said pair of support means define one side of a V-shaped cross section of a portion of an infeed spout and wherein said power roll is cylindrical and is rotated on its longitudinal axis, said longitudinal axis is arranged at an angle to said one side of V-shaped portion formed by said support means thereby to tend to force said log toward an apex of said V-shaped cross section.

3. An infeed for a chipper as defined in claim 1 wherein said backing member is a cylindrical backing roll and wherein said backing member support means is formed by the periphery of said roll.

4. Infeed for chipper as defined in claim 3 where said chipper is a slab chipper and said log is a slab further comprising, means to rotate said backing roll on its cylindrical axis, said cylindrical axis of said backing roll being inclined to the direction of feed of said slab along said feed path, said direction of rotation of said backing roll and said inclination of said cylindrical axis of said backing roll applying a force to a slab being advanced along said feed path tending to move an edge of said slab contacting said backing roll in a direction substantially perpendicular to the direction of feed of said slab to said chipper.

5. An infeed for a chipper as defined in claim 2 wherein said backing member is a substantially cylindrical backing roll.

6. An infeed for a chipper as defined in claim 5 wherein said chipper is a slab chipper and wherein said log is a slab, further comprising means to rotate said backing roll on its cylindrical axis, said cylindrical axis of said backing roll being inclined from said apex upstream in the direction of feed of said slab along said feed path, said inclination and the direction of said rotation of said backing roll insuring that said backing roll applies forces to the side of the said slab contacting said backing roll that tend to lift said side of said slab up the side of said V-shaped spout defined by said pair of support means.

7. An infeed for a chipper as defined in claim 2 wherein said angle is between 5° and 50°.

8. An infeed for a chipper as defined in claim 7 wherein said angle is between 15° and 35°.

* * * * *